Dec. 9, 1969          J. PASINI III          3,482,635
POLYACRYLAMIDE REMOVAL FROM POROUS MEDIA
Filed March 6, 1967
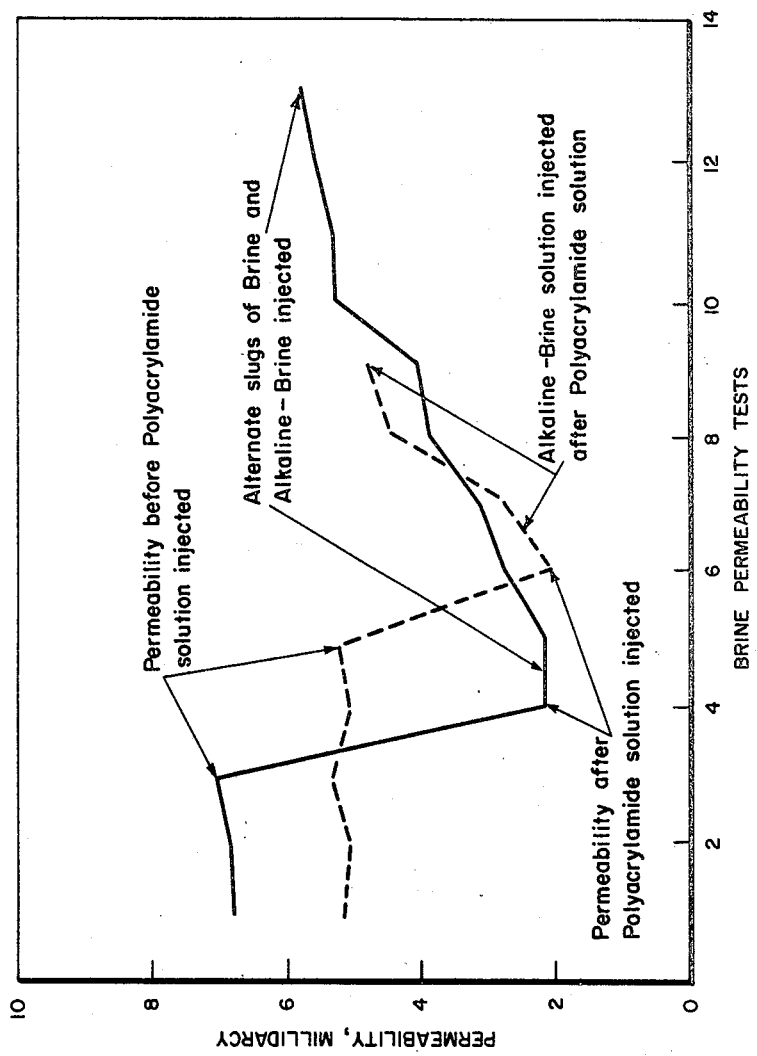
INVENTOR
Joesph Pasini III
BY *Ernest F. Cohen*
     *Robert M. Davidson*

United States Patent Office 3,482,635
Patented Dec. 9, 1969

3,482,635
POLYACRYLAMIDE REMOVAL FROM POROUS MEDIA
Joseph Pasini III, Morgantown, W. Va., assignor to the United States of America as represented by the Secretary of the Interior
Filed Mar. 6, 1967, Ser. No. 621,408
Int. Cl. E21b 43/25, 37/00
U.S. Cl. 166—305         3 Claims

ABSTRACT OF THE DISCLOSURE

Polyacrylamide is removed from porous media by treatment with alkaline solution. Also, polyacrylamide may be removed by alternately contacting porous media with an alkali solution and a neutral solution.

Solutions of polyacrylamide in water or brine are commonly used in the petroleum industry to enhance the secondary recovery of crude oil during waterflooding, by impeding the flow of water or gas through "loose streaks" in gas repressuring or storage operations and to control flow through reservoirs under similar conditions. These same solutions are also used to simulate field conditions on laboratory cores. In either case, it is often desirable to remove the polymer from the porous formation to increase permeability and allow other types of recovery techniques to be carried out such as waterflooding or thermal operations.

Brief summary of invention

At present there is no known method for removing polyacrylamide from porous media.

I have now found that polyacrylamide may be removed from porous media by a treatment with an alkaline solution. Generally, an alkaline brine is used and may be supplied to the affected zone alternately with a non-alkali brine.

The figure shows the restoration in permeability of a core whose permeability had been decreased by treatment with polyacrylamide when the core is treated with an alkaline brine, and with alternate slugs of alkaline brine and non-alkaline brine.

Accordingly, it is an object of this invention to provide a method for removing polyacrylamide from porous formations.

It is a further object of this invention to provide a method for the removal of polyacrylamide from underground porous formations.

Further, it is an object of this invention to provide a method for removing polyacrylamide from test cores.

The present invention finds utility in both the field and laboratory. In the field polyacrylamide is often used to block off certain porous regions to prevent water from entering the pay zone. It is also used to enable higher operating pressures which in some instances are desirable.

In many instances the operator subsequent to the injection of polyacrylamide will want to be able to remove the polymer and thus increase formation permeability to allow the use of recovery techniques which require this increase in permeability or to follow a slug of polyacrylamide solution with normal flooding water.

I have found that this objective may be accomplished by treating the polymer-charged formation with an alkaline solution.

The theory of the invention is not established although it is believed that the alkaline solution oversaturates the polymer chains and causes them to constrict and ball up so that they become part of the flowing system rather than an obstruction to flow. Alkaline solutions which may be used include basic aqueous solutions of 1A and 2A metals, especially of sodium, potassium and calcium, or mixtures thereof. Where the formation to be treated contains swelling clays such as montmorillonite, it is advantageous to supply the basic solution in the form of a brine to prevent swelling. Thus, for example, the alkaline-brine may consist of a basic solution of calcium and sodium and potassium chloride.

The parameters of the treatment, time, temperature and concentration are not critical and may easily be adjusted by the operator to suit local conditions.

Removal of polyacrylamide begins as soon as the basic solution contacts the formation plugged with the polymer and can be effected to any degree desired including substantially complete removal.

I have also found that removal of polyacrylamide may be accomplished by contacting the polymer blocked porous region with alternate slugs of basic and neutral solutions. Where the use of brines is desirable, the treatment may comprise alternate contact with a basic solution of calcium and sodium chloride and a neutral solution of calcium and sodium chloride.

Although the present invention is of great value in field operations bringing forth results never before thought possible, it will also be recognized by those of skill in the art as a valuable laboratory technique useful in regenerating sample cores which have been treated with polyacrylamide. By so using the present invention, not only will expensive and hard to duplicate sample cores be saved for further use, but also there will be a great savings in time.

The same methods as outlined above for field treatments may be used to remove polyacrylamide from laboratory cores.

The following examples while not intended to be limiting are illustrative of the present invention.

Example 1

A Berea sandstone sample core measuring two inches in diameter and eight inches in length was treated by injection with ⅙ pore volume of a 1,000 parts per million aqueous polyacrylamide solution. The initial brine permeability of the core dropped from about 7 millidarcys to about 2 millidarcys, as shown by the solid line in the figure. Thereafter, the core was subjected to alternate slugs of 2 pore volumes of 0.05 N alkaline brine and 2 pore volumes of brine (10,000 parts per million sodium chloride and 1,000 parts per million calcium chloride). The results of this treatment are represented by the solid line in the figure.

Example 2

A sample core of the type used in Example 1 having an initial permeability of about 5 millidarcys was injected with ⅙ pore volume of a 1,000 parts per million aqueous solution of polyacrylamide whereupon the permeability quickly dropped to about 2 millidarcys as shown by the broken line in the figure. Thereafter, the plugged core was contacted with 10 pore volume of a 0.1 N weight percent solution of alkaline brine. The permeability began to rise and the core was soon returned to about the original level as shown by the broken line in the figure.

Having described the process in the form of preferred embodiments and examples, it will be apparent to those of skill in the art that many modifications and adaptations are possible. Such changes as may be construed to fall within the scope and meaning of the appended claims is also considered to be within the spirit and intent of the invention.

What is claimed is:

1. A process for increasing the permeability of a porous media which has had its permeability decreased by treatment with polyacrylamide comprising alternately contacting said porous media with an alkali solution and a neutral solution.

2. The process of claim 1 wherein said alkali solution and said neutral solution are aqueous.

3. The process of claim 2 wherein said alkali solution and said neutral solution each contains ions selected from the group consisting of sodium, potassium, calcium or mixtures thereof.

References Cited

UNITED STATES PATENTS

| 2,607,428 | 8/1952 | Bond et al. | 166—22 |
|---|---|---|---|
| 2,827,964 | 3/1958 | Sandiford et al. | 166—42 X |
| 3,002,960 | 10/1961 | Kolodny. | |
| 3,302,717 | 2/1967 | West et al. | 166—33 |
| 3,306,870 | 2/1967 | Eilers et al. | 166—33 X |
| 3,367,418 | 2/1968 | Routson | 166—9 |
| 3,370,649 | 2/1968 | Wolgemuth | 166—9 |
| 3,372,748 | 3/1968 | Cook | 166—9 |

OTHER REFERENCES

Frick, Thomas C.: Petroleum Production Handbook, vol. II, New York, McGraw-Hill, 1962, pp. 22–1 and 22–2.

CHARLES E. O'CONNELL, Primary Examiner

IAN A. CALVERT, Assistant Examiner

U.S. Cl. X.R.

134—29; 166—312